(12) United States Patent
Jagetiya et al.

(10) Patent No.: US 8,700,063 B2
(45) Date of Patent: Apr. 15, 2014

(54) SYSTEMS AND METHODS FOR GENERATING CALLED DEVICE LOCATION BASED ON CELL SECTOR INFORMATION

(75) Inventors: Vikas Jagetiya, Rajasthan (IN); Ranganath Nacham, Andhra Pradesh (IN)

(73) Assignee: QUALCOMM Incorporated, San Diego, CA (US)

(*) Notice: Subject to any disclaimer, the term of this patent is extended or adjusted under 35 U.S.C. 154(b) by 963 days.

(21) Appl. No.: 12/538,141

(22) Filed: Aug. 9, 2009

(65) Prior Publication Data

US 2011/0034181 A1 Feb. 10, 2011

(51) Int. Cl.
*H04W 24/00* (2009.01)

(52) U.S. Cl.
USPC ............ 455/456.2; 455/456.1; 455/456.3; 455/456.4; 455/456.5; 455/456.6; 455/458

(58) Field of Classification Search
USPC ............. 455/434, 432.1–432.2, 435.2–435.2, 455/436–453, 507, 509, 511–515, 517, 455/524–525; 370/328–329, 331–332, 370/338–350; 379/207.13, 201.06
See application file for complete search history.

(56) References Cited

U.S. PATENT DOCUMENTS

| 2002/0042277 | A1 | 4/2002 | Smith | |
|---|---|---|---|---|
| 2003/0016804 | A1* | 1/2003 | Sheha et al. | 379/201.06 |
| 2006/0030333 | A1* | 2/2006 | Ward et al. | 455/456.1 |
| 2008/0070593 | A1 | 3/2008 | Altman et al. | |

FOREIGN PATENT DOCUMENTS

WO WO9800988 1/1998

OTHER PUBLICATIONS

International Search Report and Written Opinion—PCT/US2010/044426—International Search Authority, European Patent Office, Oct. 14, 2010.
ETSI TS 122 087 V8.0.0,"Digital cellular telecommunications system (Phase 2+); Universal Mobile Telecommunications System (UMTS); LTE; User-to-user signalling (UUS); Stage 1," Technical Specification, 3GPP TS 22.087 version 8.0.0 Release 8, Jan. 2009, pp. 17.
ETSI TS 123 040 V8.5.0, "Digital cellular telecommunications system (Phase 2+); Universal Mobile Telecommunications System (UMTS); LTE; Technical realization of Short Message Service (SMS)," Technical Specification, 3GPP TS 23.040 version 8.5.0 Release 8, Jun. 2006, pp. 203.

(Continued)

*Primary Examiner* — Kashif Siddiqui
*Assistant Examiner* — Shahriar Behnamian
(74) *Attorney, Agent, or Firm* — Fariba Yadegar-Bandari

(57) ABSTRACT

Implementations relate to systems and methods for generating called device location based on cell sector information for the called mobile device. Implementations relate to platforms and techniques relate in which a calling device can call a called device, such as a cellular telephone or network-enabled media player. The network can locate the called device using a paging process transmitted via the mobile switch(es) and associated base station(s) of the called device service provider. The called device can respond to the paging process by transmitting a message. The cell sector location of the base station to which the called device responds can be captured as the current location of the called device. The network can report the location of the called device to the calling device using different message formats, including SMS or USSD messages.

49 Claims, 9 Drawing Sheets

(56) References Cited

OTHER PUBLICATIONS

ETSI TS 124 008 V8.5.0, "Digital cellular telecommunications system (Phase 2+); Universal Mobile Telecommunications System (UMTS); LTE; Mobile radio interface Layer 3 specification; Core network protocols; Stage 3," Technical Specification, 3GPP TS 24.008 version 8.5.0 Release 8, Mar. 2003, pp. 582.

ETSI TS 124 011 V8.2.0, "Digital cellular telecommunications system (Phase 2+); Universal Mobile Telecommunications System (UMTS); LTE; Point-to-Point (PP) Short Message Service (SMS) support on mobile radio interface," Technical Specification, 3GPP TS 24.011 version 8.2.0 Release 8, Jun. 2009, pp. 111.

ETSI TS 124 090 V8.0.0, "Digital cellular telecommunications system (Phase 2+); Universal Mobile Telecommunications System (UMTS); LTE; Unstructured Supplementary Service Data (USSD); Stage 3," Technical Specification, 3GPP TS 24.090 version 8.0.0 Release 8, Jan. 2009, pp. 15.

* cited by examiner

SYSTEMS AND METHODS FOR GENERATING CALLED DEVICE LOCATION BASED ON CELL SECTOR INFORMATION

BACKGROUND

The present teachings relate generally to method and apparatus for generating a called device location based on cell sector information, and more particularly to platforms and techniques for capturing the location of a called mobile device in the network based on the responding cell sector location serving the called device.

Location-based services have enjoyed increasing popularity with mobile cellular and other service providers. The identification of a current location of a mobile device allows the user to search for content, service, social network, and other opportunities based on their proximity to locations of interest. Applications continue to be developed for users wishing to receive location-based content based on the location of their mobile device. In many cases, the location data used to derive value-added location content is based on Global Positioning System (GPS) location capability built into the mobile device.

For some users, there may be additional interest in gaining location information reflecting the location of the mobile device to which the user wishes to place a telephone call. For example, a supervisor or manager in a business organization may wish to learn the location of employees or business assets. In this type of application, for example, a manager at a shipping company may wish to locate the driver of a delivery truck on a certain delivery route. For further example, parents may wish to check the location of children to ensure their security. For another example, friends who subscribe to a social networking service or otherwise may wish to receive an update on the location of friends with whom they plan to congregate for a concert, dinner, or other function. In general, location-based services based on the location of a called device are lacking in the marketplace, particularly in cases where the called device is not equipped with GPS capability.

SUMMARY

According to the present teachings in one or more aspects, systems and methods for generating a called device location based on cell sector information are provided. Various aspects relate to a method of generating location data for a mobile device. The method includes initiating a voice call from a calling device to a called mobile device, receiving a request from the calling device to capture location data of the called mobile device, initiating a paging process to locate the called mobile device via a called device service provider, identifying a cell sector location for the called mobile device based on a paging response of the called mobile device via the called device service provider; generating called device location data for the called mobile device based on the cell sector location identified via the called device service provider, and transmitting the called device location data to the calling device.

Various aspects relate to a system for generating location data for a mobile device. The system includes a server, communicating with a wireless interface to a called mobile device. The server is configured to initiate a voice call from a calling device to the called mobile device, receive a request from the calling device to capture location data of the called mobile device, initiate a paging process to locate the called mobile device via a called device service provider, identify a cell sector location for the called mobile device based on a paging response of the called mobile device via the called device service provider, generate called device location data for the called mobile device based on the cell sector location identified via the called device service provider, and transmit the called device location data to the calling device.

One or more aspects relate to a system for generating location data for a mobile device. The system includes means for serving data to a called mobile device. The means for serving data is configured to initiate a voice call from a means for calling to the called mobile device, receive a request from the means for calling to capture location data of the called mobile device, initiate a paging process to locate the called mobile device via a called device service provider, identify a cell sector location for the called mobile device based on a paging response of the called mobile device via the called device service provider, generate called device location data for the called mobile device based on the cell sector location identified via the called device service provider, and transmit the called device location data to the means for calling.

Various aspects further relate to a computer program product comprising computer-readable medium. The computer-readable medium comprising or encoding at least one instruction for causing a computer to initiate a voice call from a calling device to a called mobile device, at least one instruction for causing a computer to receive a request from the calling device to capture location data of the called mobile device, at least one instruction for causing a computer to initiate a paging process to locate the called mobile device via a called device service provider, at least one instruction for causing a computer to identify a cell sector location for the called mobile device based on a paging response of the called mobile device via the called device service provider, at least one instruction for causing a computer to generate called device location data for the called mobile device based on the cell sector location identified via the called device service provider, and at least one instruction for causing a computer to transmit the called device location data to the calling device.

Various aspects in further regards relate to a method of receiving location information for a called device. The method includes initiating a voice call to a called mobile device serviced by a called device service provider, generating a request to capture location data of the called mobile device, initiating a paging process to locate the called mobile device via the called device service provider, and receiving called device location data for the called mobile device based on a cell sector location identified via the paging process of the called device service provider.

Various aspects likewise relate to a communications device. The device including an interface to a called device service provider and a processor, communicating with the interface. The processor is configured to initiate a voice call to a called mobile device serviced by the called device service provider, generate a request to capture location data of the called mobile device, initiate a paging process to locate the called mobile device via the called device service provider, and receive called device location data for the called mobile device based on a cell sector location identified via the paging process of the called device service provider.

Various aspects relate to a communications device. The device includes means to provide an interface to a called device service provider and means for processing communicating with the interface. The means for processing being configured to initiate a voice call to a called mobile device serviced by the called device service provider, generate a request to capture location data of the called mobile device, initiate a paging process to locate the called mobile device via the called device service provider, and receive called device location data for the called mobile device based on a cell sector location identified via the paging process of the called device service provider.

Various aspects in further regards relate to a computer program product comprising computer-readable medium. The computer-readable medium being configured to program a communications device and comprising or encoding at least one instruction for causing a computer to initiate a voice call to a called mobile device serviced by a called device service provider, at least one instruction for causing a computer to generate a request to capture location data of the called mobile device, at least one instruction for causing a computer to initiate a paging process to locate the called mobile device via the called device service provider, and at least one instruction for causing a computer to receive called device location data for the called mobile device based on a cell sector location identified via the paging process of the called device service provider.

According to various implementations of the present teachings, a calling device can initiate a voice call to a called device over the mobile network. The mobile network can be configured to receive the request to initiate the call to the called device, and proceed to locate the called mobile device via a paging process which searches for the called mobile device over a paging channel in the called device service provider's service area. The network can detect the responding base station to which the mobile device responds, and capture cell sector information for that base station, including cell sector ID, and/or location specified by latitude/longitude data points for that base station. The called device service provider can extract such location information from the terminating network edge of the call, and encapsulate that data in one of multiple formats to transmit to the calling device. Those formats can include, for instance, SMS (Short Messaging System) messages, USSD (Unstructured Supplementary Service Data) messages, and/or other data formats or protocols. Upon receipt of the called device location information, the calling device can display the location of the called device on a graphical interface or other output. The location can, in one or more implementations, be updated as the called device travels throughout different areas. In one or more implementations, the location information for the called device can be received on an automatic or user-requested basis, and can represent a value-added service to which the user of the calling device subscribes, for instance, for a fee. Other service arrangements can be used, but in all cases, called-device location data can be generated without a necessity for the called device to be equipped with GPS capability, since location information is generated by network resources themselves.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated in and constitute a part of this specification, illustrate aspects of the present teachings and together with the description, serve to explain principles of the present teachings. In the figures.

DETAILED DESCRIPTION

Aspects of the present teachings relate to systems and methods for generating a called device location based on call sector information for the called device.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

In the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Figure 1:
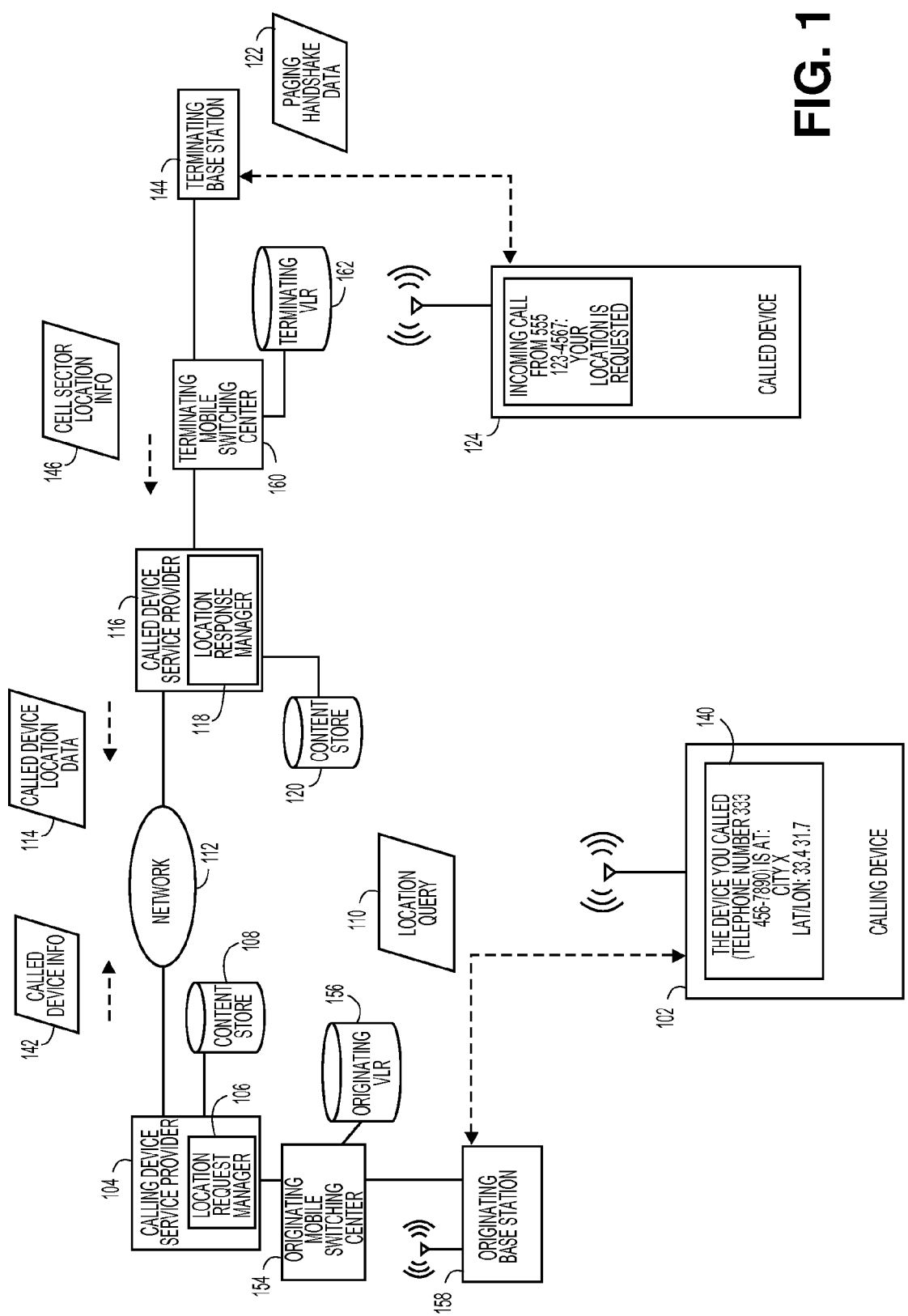
FIG. 1 illustrates an overall network configured to support location processing including systems and methods for generating called device location based on cell sector information, according to one or more implementations.

In one or more aspects, and as for example generally shown in FIG. 1, platforms and techniques are provided in which a calling device 102 can place a voice telephone call to mobile called device 124 via network 112 and other network connections. In one or more implementations, the called device 124 can be or include a mobile cellular telephone, a mobile network-enabled media device, a mobile network-enabled personal digital assistant, or other device or client. In one or more implementations, the calling device 102, as illustrated, can be or include a mobile cellular telephone, a fixed landline telephone, a mobile network-enabled media device, a mobile network-enabled personal digital assistant, or other device or client. Calling device 102 can include a user interface 140, such as a display screen to display call-related information.

Calling device 102 can communicate with a calling device service provider 104. Calling device service provider 104 can host, maintain, access, or communicate with an associated set of network resources, which can, for instance, be or include an originating mobile switching center (MSC) 154 along with an associated originating visitor location register (VLR) 156. On the originating side, originating mobile switching center 154 can be linked with an originating base station 158, through which the incoming call from calling device 102 can be received. Calling device service provider 104 can maintain or access additional links, switches, base stations, databases, and other infrastructure to support cellular or other operations. Calling device service provider 104 can, for instance, maintain a content store 108 to store media and other content for delivery to mobile or other users. According to one or more implementations, calling device service provider 104 can host or incorporate a location request manager 106, such as an application, logic, or server configured to process messaging related to the capture and delivery of location data for the called device 124.

In terms of reaching the intended called device 124, calling device service provider 104 can communicate with a called device service provider 116 servicing that device via a network 112. In one or more implementations, network 112 can be or include one or more telecommunications or other data networks or connections, such as, for example, a mobile switching network, the public switched telephone network (PSTN) which can be or include a Switching System 7 (SS7) communications network, the Internet, or other public or private data network, or other channels or connections.

Called device service provider 116 can likewise be or include a mobile carrier maintaining mobile switches, base stations, and other infrastructure to support cellular or other operations. Called device service provider 116 can host, maintain, access, or communicate with an associated set of network resources, which can, for instance, be or include a terminating mobile switching center (MSC) 160 along with an associated terminating visitor location register (VLR) 162. Terminating mobile switching center 160 can be linked with a terminating base station 144, through which the incoming call from calling device 102 can be communicated to called device 124. Calling device service provider 104 can maintain or access additional links, switches, base stations, databases, and other infrastructure to support cellular or other operations. Called device service provider 116 can, for instance, maintain a content store 120 to store media and other content for delivery to mobile or other users. According to one or more implementations, called device service provider 116 can host or incorporate a location response manager 120, such as an application, logic, or server configured to process messaging related to the capture and delivery of location data for the called device 124.

In one or more implementations as shown, the calling device 140 can initiate a call to called device 124 by transmitting called device information 142 to the calling device service provider 104. Called device information 142 can include the telephone number of the called device 124, such as a 10-digit number in "(123) 456-7890" format. Other formats and/or identifiers for the called device 124, as well as other data, can be used as part of called device information 142. Calling device service provider 104 can receive called device information 142, and initiate messaging with called device service provider 116 to locate called device 124, and establish a voice channel and/or other channels to called device 124. Location request manager 106 can generate a location query 110 to transmit to called device service provider 118, as part of the call initiation phase or later phases of communication with called device 124. According to one or more implementations, location query 110 can be automatically generated as part of the call initiation, for instance, based on user preferences stored in calling device service provider 104 for the user of calling device 102. According to further implementations, location query 110 can be generated based on user-supplied input, such as a USSD (Unstructured Supplementary Service Data) request inputted by the user on calling device 102, as for instance described herein. According to one or more implementations in further regards, the location query 110, in whatever format that message may be generated, can initiate the capture of called device location data 114 for called device 124, to transmit to calling device 102.

According to one or more implementations, the location of called device 124 can be captured using a paging or other discovery process initiated via called device service provider 116. The called device service provider 116 can respond to the initiation of the call to called device 124, including called device information 142 and/or location query 110, by generating an exchange of paging handshake data 122 to probe the service area of called device service provider 116 to locate called device 124. According to one or more implementations in various regards, paging handshake data 122 can be transmitted via the terminating mobile switch 160 and/or other resources of called device service provider 116 to locate a terminating base station 144 with which mobile device 124 is registered or to which mobile device 124 responds to paging handshake data 122. Aspects of the paging process and paging handshake data 122 are illustrated, for instance, in FIG. 2, as described herein.

According to one or more implementations, called device service provider 116 can be configured to receive or access cell sector location data 146 associated with terminating base station 144. Cell sector location data 146 can include, for instance, the cell sector ID for terminating base station 144, the location of terminating base station 144, for instance expressed in terms of latitude and longitude data points, and/or other location, geographic, or network information related to terminating base station 144. The location response manager 118 of called device service provider 116 can embed cell sector location data 146 captured in this fashion into called device location data 114, and transmit called device location data 114 to calling device 102 via network 112, calling device service provider 104, and associated resources. In one or more implementations, cell sector location data 114 can be incorporated in called device location data 114 in a variety of formats, datagrams, or other encoding schemes or types, including, without limitations, those described in connection with FIG. 3 (SMS, Short Message Service message) and FIG. 4 (USSD, Unstructured Supplementary Service Data), and described herein. Other types of messaging, formats, protocols, and/or connections can be used to transmit called device location data 114 to the originating caller.

After receiving called device location data 114, calling device 114 can display the location of called device 124 on user interface 140, as shown. The user of calling device can therefore be made aware of the location of the called device 124. The location of called device 124 can be displayed on user interface 140, for instance, in the form of a map, address, latitude/longitude values, or using other representations. In one or more implementations, the called device location data 114 can be updated to display any change in location of called device 124. In one or more implementations, called device location data 114 can be updated automatically via called device service provider 116 and/or other resources. In one or more implementations, called device location data 114 can be updated according to a user-supplied input or request.

According to one or more implementations, an initial or updated report of the location of called device 124 may be useful, for instance, in business applications where a supervisor or manager wishes to learn the location of an employee. Location information for called device 124 can likewise be useful, for instance, to a parent wishing to learn the location of a child or other family member. In one or more implementations, and as shown for instance in FIG. 1, the called device 124 can display the identity of the calling device 102 on a user interface upon receipt of the incoming call. In one or more implementations, a set of user preferences or profile can be stored in called device 124 to control various operations of that device, including causing called device 124 to automatically accept or decline a location query associated with an incoming call. User preference data can, for instance, be stored on called device 124, in called device service provider 116, and/or other locations. In one or more implementations, the set of user preferences for accepting or declining location reporting can be set to different choices for specific incoming telephone numbers that identify calling device 102.

Figure 2:
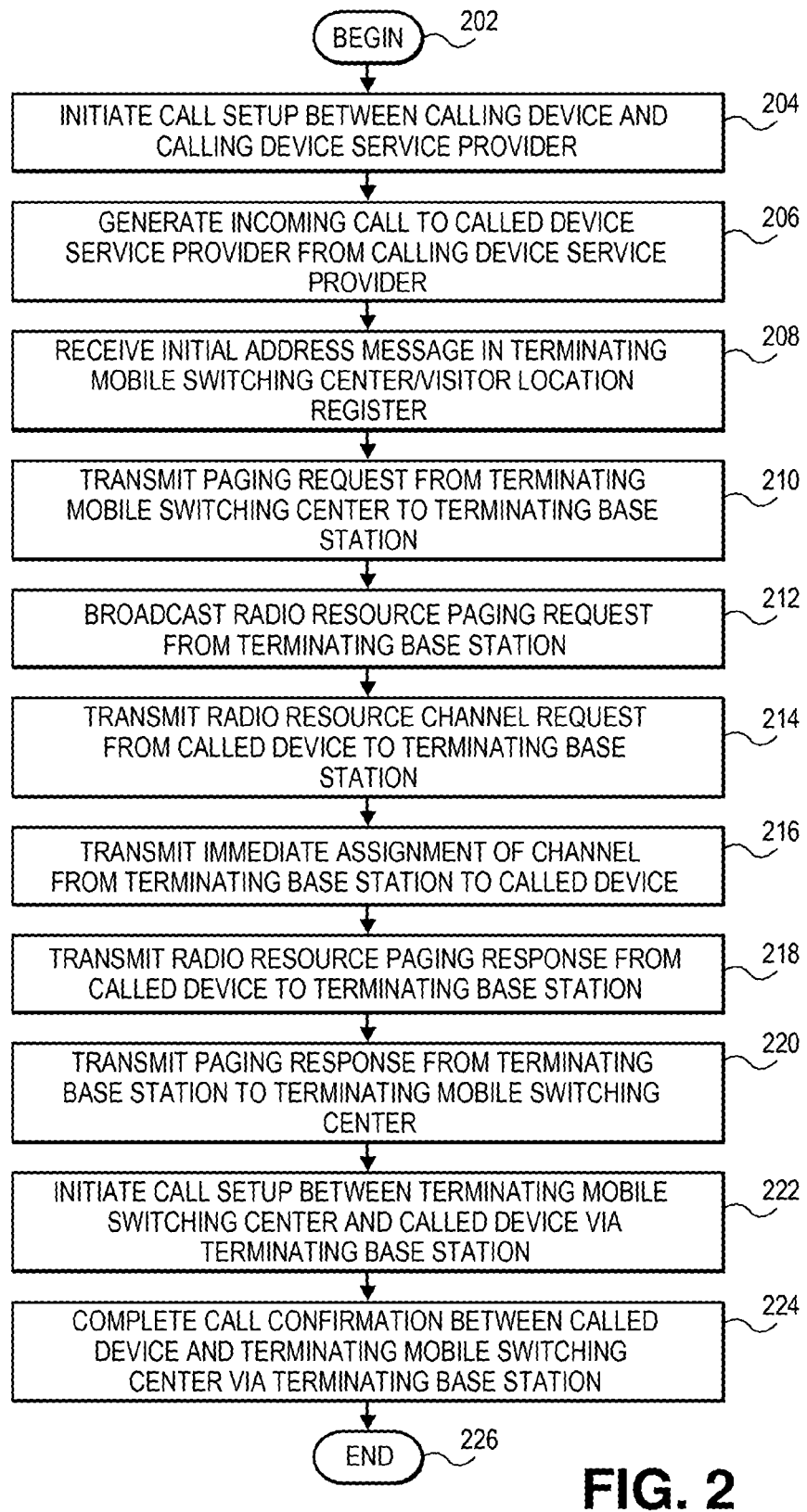
FIG. 2 illustrates a flowchart of call processing that can be used to conduct a call setup phase during an initiated call to a called mobile device, according to one or more implementations.

FIG. 2 illustrates a flowchart of processing that can be used to conduct paging operations, generate paging handshake data 122 to locate called device 124, complete the call setup phase, and initiate the capture and reporting of the location of that device, according to one or more implementations. It may be noted that while call setup and paging operations illustrated in FIG. 2 generally conform to, or are consistent with, standards for GSM (Global System for Mobile communication) network implementations, in one or more implementations, other networks, and paging processing can be used. For instance, in one or more implementations, call-device location processing can be conducted via CDMA (code division multiple access) and/or other networks.

In one or more implementations as shown, processing can begin in 202. In 204, call setup operations can be initiated between calling device 102 and calling device service provider 104 for instance, by way of a user dialing a keypad on calling device 102 can pressing a "talk" or other key. In 206, an incoming call to called device service provider 116 from calling device 102 via calling device service provider 104 can be initiated/generated. In 208, an initial address message containing, for instance, called device information 142 including the telephone number of called device 124, can be received in terminating mobile switching center 160, and for example, checked against associated terminating visitor location register 162. In 210, a paging request can be transmitted from the terminating mobile switching center 160 to the terminating base station 144. In 212, a radio resource paging request can be broadcasted from terminating base station 144 to mobile devices in its service area, as part of paging handshake data 122.

In 214, upon receipt of paging handshake data 122 including the included radio resource paging request, the called device 124 can transmit a radio resource channel request as part of paging handshake data 122 to the terminating base station 144. In 216, terminating base station 144 can transmit an immediate assignment of a channel to called device 124. In 218, after channel acquisition, called device 124 can transmit a radio resource paging response as part of paging handshake data 122 to terminating base station 144. In 220, the radio resource paging response can be transmitted from terminating base station 144 to the terminating mobile switching center 160. In 222, call setup for the requested call can be initiated between terminating mobile switching center 160 and called device 124 via terminating base station 144. In 224, call confirmation processing can be completed between called device 124 and terminating mobile switching center 160 via terminating base station 144, establishing a voice channel between calling device 102 and called device 124. In 226, processing can repeat, return to a prior processing point, jump to a further processing point, or end.

Figure 3:
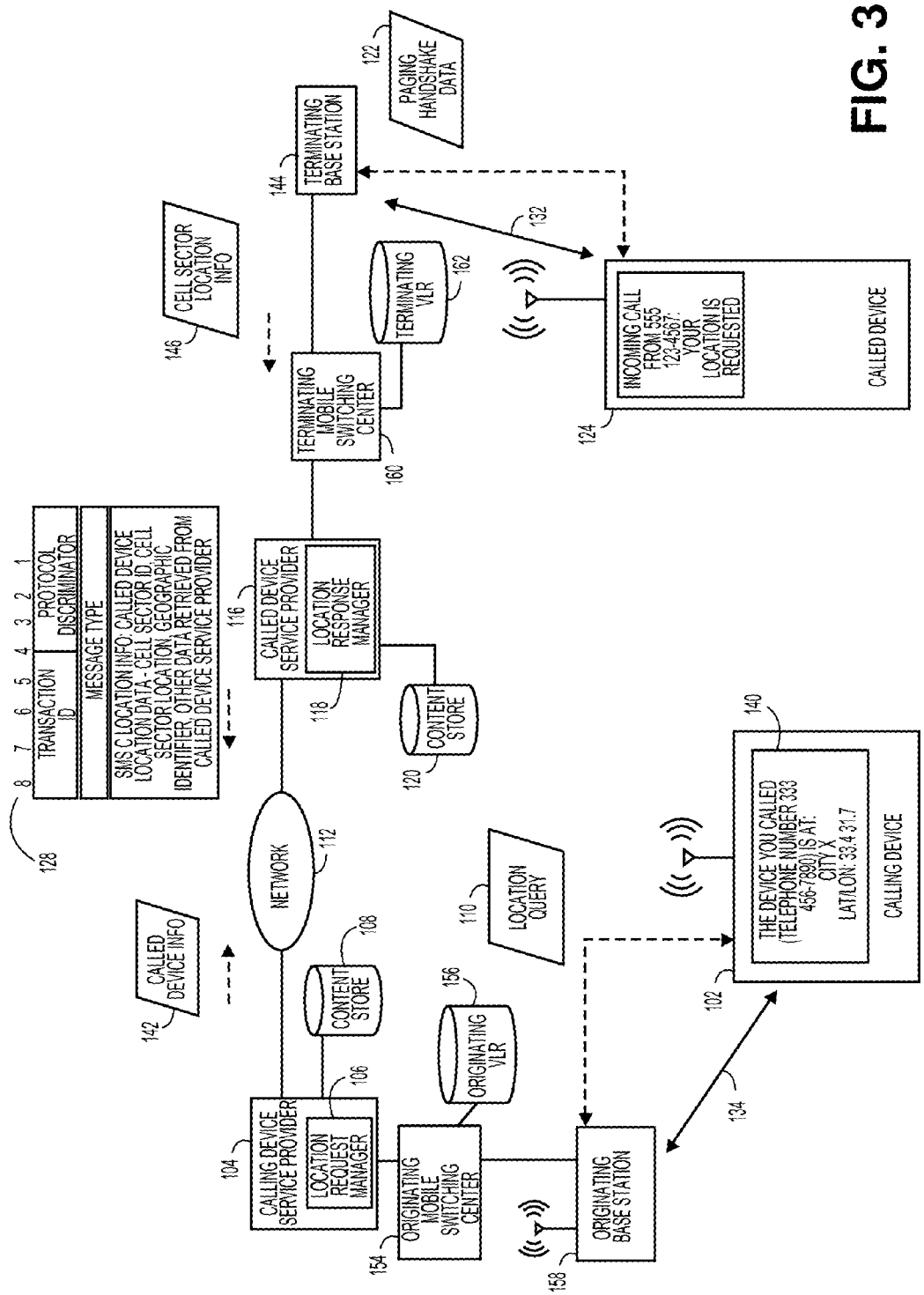
FIG. 3 illustrates a network configured to support location processing based on cell sector information using SMS (Short Message System) messaging, according to one or more implementations.

FIG. 3 illustrates systems and methods for generating called device location information, in which a SMS (Short Messaging System) message format can be used to encode called device location data 114. According to one or more implementations as shown, the initiation of call and paging events can take place using operations generally consistent with those shown in FIGS. 1 and 2. In one or more implementations, a voice call can be initiated using operations generally consistent with those shown in FIGS. 1 and 2, including to transmit called device information 142 and other information via calling device service provider 104, network 112, and called device service provider 116 to initiate paging operations to location called device 124. According to one or more implementations, paging operations can generally follow processing shown, for instance, in FIGS. 1 and 2 to locate called device 124 and receive cell sector location information 146 through a terminating base station 144. In one or more implementations as shown, the captured location information can be encoded or embedded in an SMS location message 128, as shown. The SMS location message 128 can be encoded in a format generally consistent with standards promulgated in the GSM-related Technical Services Technical Standards 124.008, 124.011-520, and 123.040-650 published by the European Technical Standards Institute and/or its affiliates, each of which are incorporated by reference herein in their present and future forms, and generally using a first data frame octet containing a four-byte transaction ID coupled with a four-byte protocol discriminator. In one or more implementations as shown, SMS location message 128 can include a second octet containing a message type field. As shown, SMS location message 128 can further include a set of additional octets (3-140), containing the information payload for the location message. In one or more implementations, the message reflected in SMS location message 128 can contain location information fields including, for instance, any one or more of the cell sector ID of terminating base station 144, the cell sector location of terminating base station 144, a geographic identifier for terminating base station 144 (e.g., a state or province identifier), and/or other information captured or provided by called device service provider 116. In one or more implementations, SMS location message 128 can be generated and/or communicated via a short messaging system server 130, supporting the encoding and transmission of text-based short messages via network 112 and other resources. The SMS location message 128 can be transmitted to calling device 102 via SMS channel 134. In one or more implementations, a user profile or user preferences can be used to determine a per-message charge for SMS location message 128 for users who subscribe to location message services via called device service provider 116 or other providers.

In one or more implementations such as those shown in FIG. 3 which rely upon SMS messaging to report location information to calling device 102, it may be noted that the SMS location message 128 and other data can be extracted and delivered to calling device 102 via SMS channel 134 after the completion of call setup phase of communications with called device 124, during which time a voice channel 132 to called device 124 can be established. In one or more implementations as shown, the reported location for the called device 124 can be updated in an updated SMS location message 128, for instance when the called device 124 leaves the service area of one base station and enters the service area of a second base station, whose location can then be similarly encoded in an updated SMS location message 128. In one or more implementations as shown, a record of reported locations for called device 124 and other information related to the call event between calling device 102 and called device 124 can be stored, for example, by or in calling device 102, called device 124, calling device service provider 104, called device service provider 116, associate mobile switching centers and/or base stations for those providers, and/or other locations.

Figure 4:
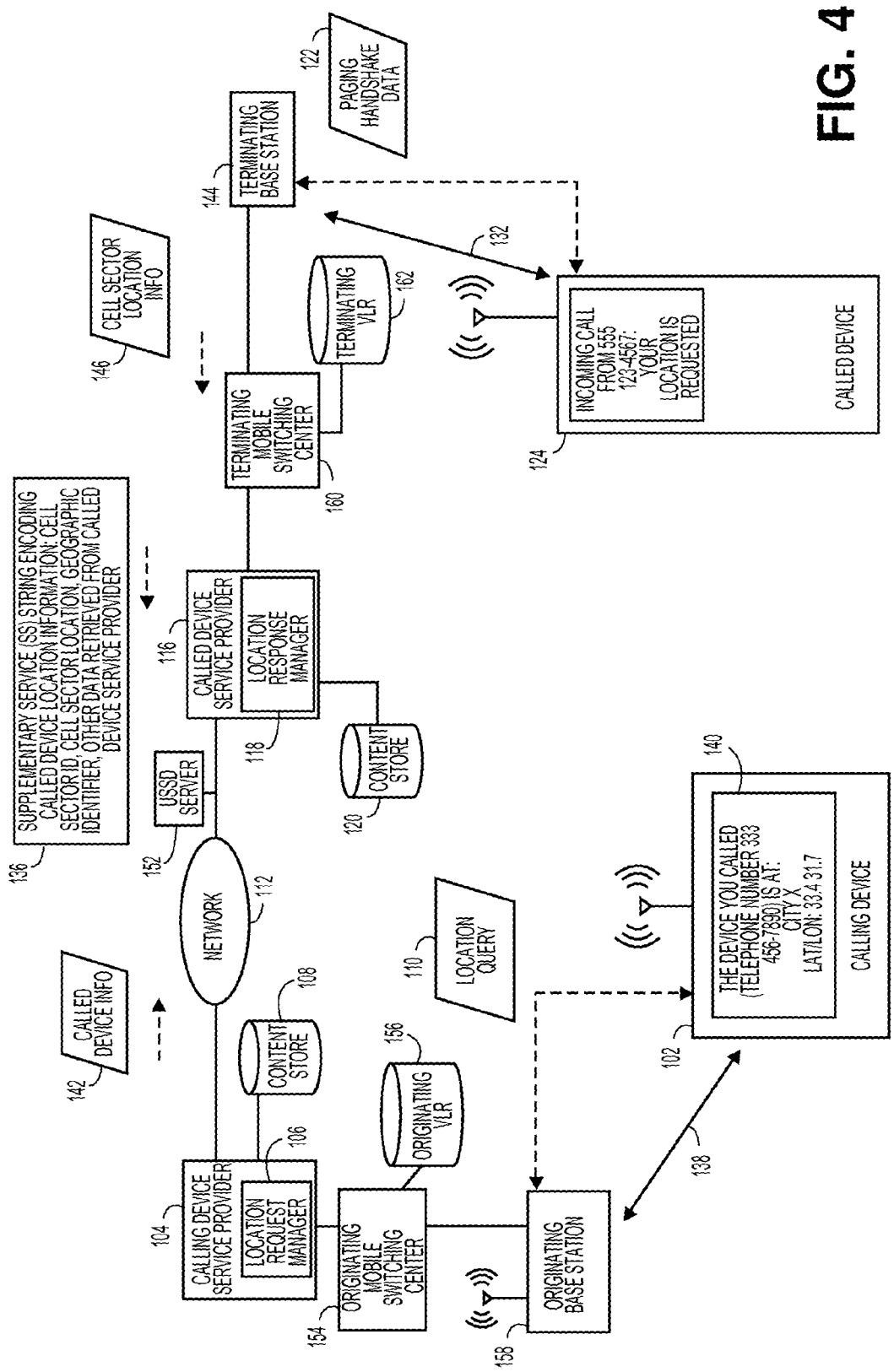
FIG. 4 illustrates a network configured to support location processing based on cell sector information using USSD (Unstructured Supplementary Service Data) messaging, according to one or more implementations.

FIG. 4 illustrates systems and methods for generating called device location information, in which a USSD (Unstructured Supplementary Service Data) message format can be used to encode called device location data 114. According to one or more implementations as shown, the initiation of call and paging events can take place using operations generally consistent with those shown in FIGS. 1 and 2. In one or more implementations, a voice call can be initiated using operations generally consistent with those shown in FIGS. 1 and 2, including to transmit called device information 142 and other information via calling device service provider 104, network 112, and called device service provider 116 to initiate paging operations to location called device 124. According to one or more implementations, paging operations can generally follow processing shown, for instance, in FIGS. 1 and 2 to locate called device 124 and receive cell sector location information 146 through a terminating base station 144. In one or more implementations as shown, the captured location information can be encoded or embedded in an USSD location message 136, as shown. The USSD location message 136 can be encoded in a format generally consistent with the GSM-related Technical Standards 124.008, 122.087-500, and 124.090-600 published by the European Technical Standards Institute and/or its affiliates, each of which is incorporated by reference herein in their present and future forms, generally using a defined data string containing alphanumeric data in a string block. In one or more implementations, the message reflected in USSD location message 136 can contain location information fields including, for instance, any one or more of the cell sector ID of terminating base station 144, the cell sector location of terminating base station 144, a geographic identifier for terminating base station 144 (e.g., a city, state or province identifier), and/or other information captured or provided by called device service provider 116. In one or more implementations, USSD location message 136 can be generated and/or communicated via a USSD server 152, supporting the encoding and transmission of alphanumeric messages via network 112 and other resources. In one or more implementations, USSD location message 136 can be initiated or transmitted based on user-supplied input, such as keypad inputs in the form of an asterisk ("*") followed by a defined digit code (e.g., "*55") according to USSD protocol. The USSD location message 136 resulting from the user-keyed request can be transmitted to calling device 102 via USSD channel 138.

In one or more implementations such as those shown in FIG. 4 which rely upon USSD messaging to report location information to calling device 102, it may be noted that the USSD location message 136 and other data can be extracted and delivered to calling device 102 via USSD channel 138 after the completion of call setup phase of communications with called device 124, during which time a voice channel 132 to called device 124 can be established. In one or more implementations as shown, the reported location for the called device 124 can be updated to reflect travel of called device 124, for instance, when the called device 124 leaves the service area of one base station and enters the service area of a second base station, whose location can then be encoded in an updated USSD location message 136.

Figure 5:
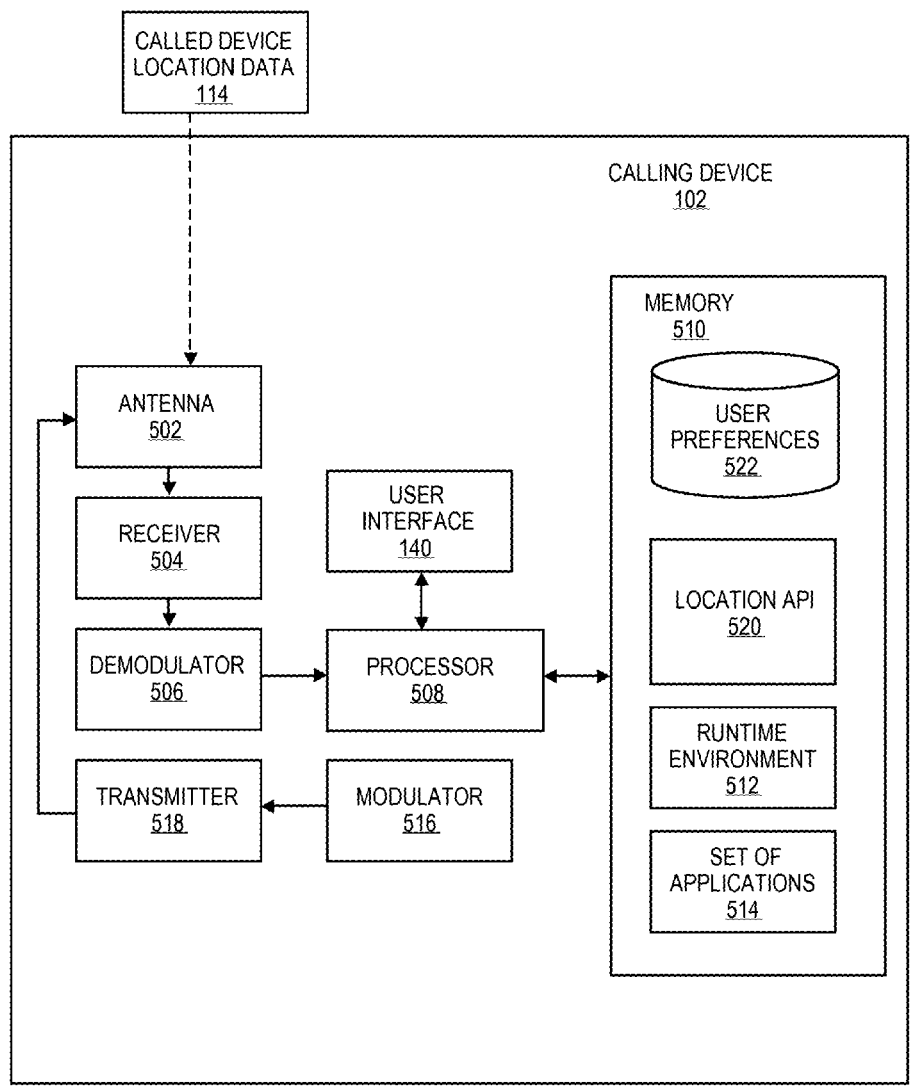
FIG. 5 illustrates an exemplary hardware configuration of a calling device, according to one or more implementations.

FIG. 5 illustrates an exemplary hardware configuration of a calling device 102, consistent with implementations of the present teachings. Calling device 102 can include at least one antenna 502 (e.g., a transmission receiver or group of such receivers comprising an input interface, etc.) that receives a signal (e.g., pertaining to a mobile call initiation or other handshake, a handshake response, a mobile application data transfer, a data event, data event response, handshake termination, and so on) and a receiver 504, which performs actions (e.g., filters, amplifies, down-converts, etc.) on the received signal. The received signal can include called device location 114, and other data, as described herein. Antenna 502 can for example transmit or receive a response to a handshake request, data event request, or the like. Antenna 502 and receiver 604 can also be coupled with a demodulator 506 that can demodulate received signals and provide them to a processor 508 for processing. Calling device 102 can additionally include memory 510 that is operatively coupled to processor 508 and that can store data to be transmitted, received, and the like.

Processor 508 can analyze information received by antenna 502 and/or a user input interface of the mobile device (not depicted), and/or generate information for transmission by a transmitter 518 via a modulator 516. Additionally, processor 508 can control and/or reference one or more resources or components (e.g., 506, 512, 514, 516, 518, etc.) of the calling device 102. Processor 508 can execute a runtime environment 512, such as the BREW® available from Qualcomm Incorporated, as well as one or more set of applications 514 or other software, modules, applications, logic, code, or the like. Processor 508 can communicate with a location API (Application Programming Interface) 520 to execute function calls to extract location information, according to the present teachings. Processor 508 can likewise couple with a user interface 140, such as a graphical user interface or other graphical display, to display graphics, video, call-related data including called device location data 114, and other information. In one or more implementations, called device 124 can comprise a device including generally similar hardware configurations as calling device 102 illustrated in FIG. 5.

Figure 6:
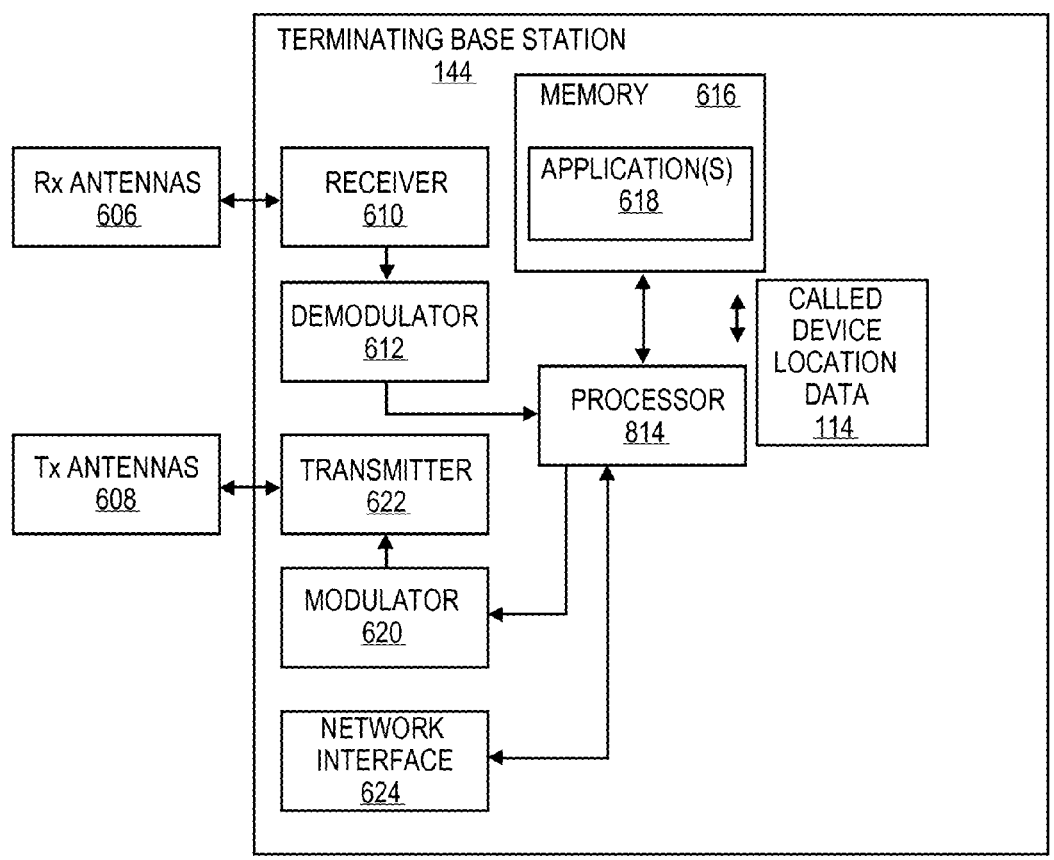
FIG. 6 illustrates an exemplary hardware configuration of a called device service provider including wireless interface, according to one or more implementations.

FIG. 6 illustrates an exemplary set of hardware resources that can be incorporated in terminating base station 144, according to various implementations. Terminating base station 144 can include, host, interface to, or maintain resources including a receiver 610 that receives signal(s) from one or more mobile devices through a plurality of receive antennas 606, and a transmitter 622 that transmits to the one or more mobile devices through a transmit antenna 608. Receiver 610 can receive information from receive antennas 606 and be operatively coupled with a demodulator 612 that demodulates received information. A processor 614 can analyze demodulated signals provided by demodulator 612. The processor 614 further couples to a memory 616 that can store one or more application 618 that can execute, support, facilitate and/or participate in communication activities as described herein, including to capture, manage and transmit called device location data 114 to calling device 102, as described herein. Processor 614 can in addition communicate with a network interface 622, such as an Ethernet or other wired, optical, or wireless interface, to communicate with network 112 and other resources. In one or more implementations, called device service provider 116 can integrate terminating base station 144, terminating mobile switch 160, visitor location register 162, and/or other resources on a co-hosted or co-located basis, or In one or more implementations, those resources can be separately or remotely installed or hosted, as shown for instance in FIG. 1. In one or more implementations, originating base station 158 of calling device service provider 104 can comprise hardware platforms or other resources generally including similar configurations to terminating base station 144 illustrated in FIG. 6. In one or more implementations, calling device service provider 104 can similarly integrate originating base station 158, originating mobile switching center 154, originating visitor location register (VLR) 156, and/or other resources on either a co-hosted or co-located basis, or can access those resources on a remote basis as, for instance, likewise shown in FIG. 1. Other configurations of calling device service provider 104 and/or called device service provider 116 and their associated resources are possible.

Figure 7:
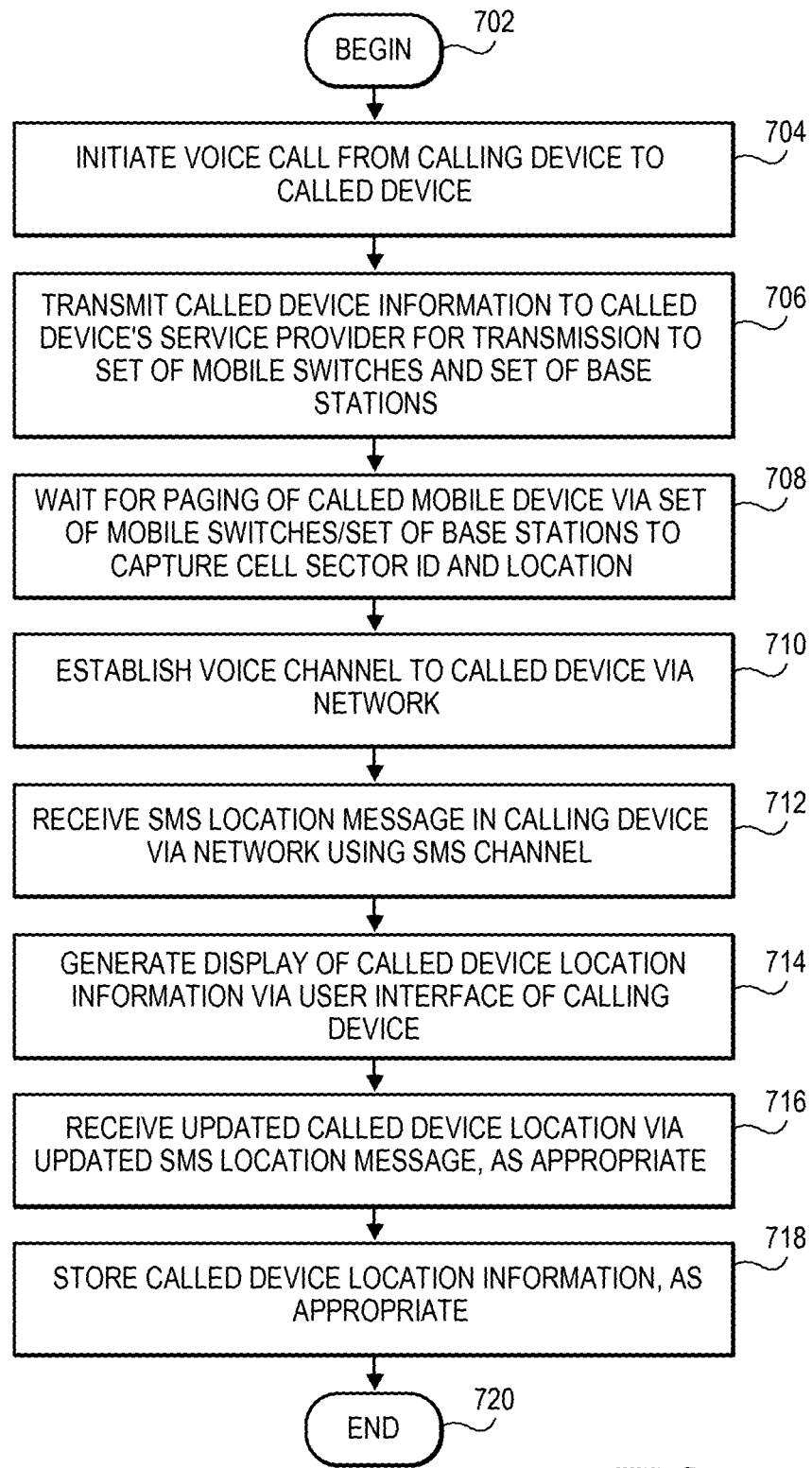
FIG. 7 illustrates a flowchart of call initiation and location processing using SMS (Short Message System) messaging, according to one or more implementations.

FIG. 7 illustrates called device location processing using the user-to-user communications protocol between users using an SMS (Short message service) channel, according to one or more implementations. It may be noted that the GSM (Global System for Mobile communication) communications framework can be used to establish communication between mobile devices in one or more implementations as reflected in standards promulgated in the GSM-related Technical Standards 124.008, published by the European Technical Standards Institute and/or its affiliates. In one or more implementations, CDMA and/or other networks can be used. In one or more implementations as shown, processing can begin in 702. In 704, a call can be initiated from the calling device 102 to the called device 124 via network 112, which can be a GSM-based network, CDMA, and/or other network. In one or more implementations, the called device 124 can be or include a mobile cellular telephone, a mobile network-enabled media device, a mobile network-enabled personal digital assistant, or other device or client. In one or more implementations, the calling device 102 can be or include a mobile cellular telephone, a fixed landline telephone, a mobile network-enabled media device, a mobile network-enabled personal digital assistant, or other device or client. In 706, called device information 142 including, for example, the dialed telephone number of called device 124 can be transmitted to the called device service provider 116 of the called device 124 via network 112. In 708, the calling device 102 can wait for the paging of called device 124 via a set of one or more mobile switches and/or associated base stations serving the service area of the called device service provider 116. The paging process can, in one or more implementations, generally be or include call setup transmissions to and from called device 124, such as those for example illustrated in FIG. 2. Other paging protocols or exchanges can be used.

In 710, a voice channel connection to called device 124 via network 112 can be established after the called device 124 has been located and registered to a mobile switch and/or base station of called device service provider 116. In 712, in response to the paging and call setup processes, the calling device 102 can receive an SMS location message 128 via network 112 using an SMS channel. SMS location message 128 can contain called device location data 114 reporting the location of the called device 124 to the user of calling device 102. Called device location data 114 can be encoded in a format, for instance, illustrated in FIG. 3, in which lower-order octets (3-140) of a standard 140-byte or extended SMS message can be encoded with the cell sector ID, cell sector location, or other information of the service provider base station in whose service area the called device 124 is currently located. In one or more implementations, other datagrams or encoding schemes consistent with the format of an SMS message can be used.

In 714, a display of called device location data 114 can be generated on calling device 102 via user interface 140, such as a screen display, text-to-speech generator, or other output. In 716, the calling device 102 can receive an updated version of called device location data 114 via an SMS location message 128, as appropriate. For example, an updated version of called device location data 114 can be generated when called device 124 enters a new service area of an adjoining base station of called device service provider 116, for instance after the call setup phase of the call to called device 124 is complete. In 718, the called device location data 114 and/or other information associated with the call event between calling device 102 and called device 124 can be stored. That information can be stored, for example, to any one or more of calling device 102, called device 124, content store 108 of calling device service provider 104, content store 120 of called device service provider 116, or other storage. In 720, processing can repeat, return to a prior processing point, jump to a further processing point, or end.

Figure 8:
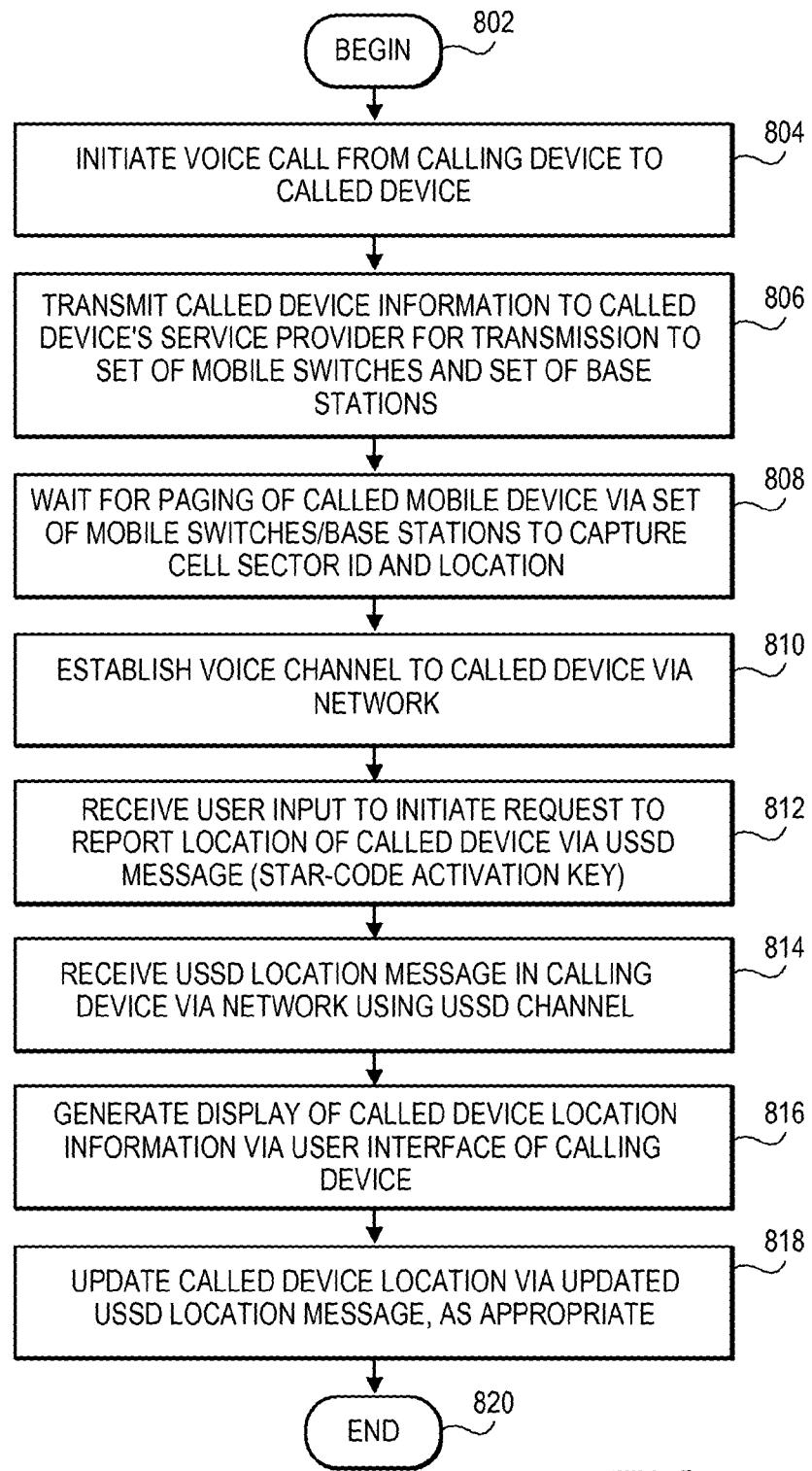
FIG. 8 illustrates a flowchart of call initiation and location processing via a called device service provider, according to one or more implementations.

FIG. 8 illustrates called device location processing using the user-to-user communications protocol between users using a USSD (Unstructured Supplementary Service Data) channel, according to various implementations. It may be noted that the GSM (Global System for Mobile communication) communications framework can be used to establish communication between mobile devices in one or more implementations as shown, as reflected in standards promulgated in the GSM-related Technical Services Interfaces 124.008, published by the European Technical Standards Institute. In one or more implementations, CDMA and/or other networks can be used. In one or more implementations as shown, processing can begin in 802. In 804, a call can be initiated from the calling device 102 to the called device 124 via network 112, which can be a GSM-based network, CDMA network, and/or other network. In one or more implementations, the called device 124 can be or include a mobile cellular telephone, a mobile network-enabled media device, a mobile network-enabled personal digital assistant, or other device or client. In one or more implementations, the calling device 102 can be or include a mobile cellular telephone, a fixed landline telephone, a mobile network-enabled media device, a mobile network-enabled personal digital assistant, or other device or client. In 806, called device information 142 including, for example, the dialed telephone number of called device 124 can be transmitted to the called device service provider 116 of the called device 124 via network 112. In 808, the calling device 102 can wait for the paging of called device 124 via a set of one or more mobile switches and/or associated base stations serving the service area of the called device service provider 116. The paging process can, in one or more implementations, generally be or include call setup transmissions to and from called device 124, such as those for example illustrated in FIG. 2. Other paging protocols or exchanges can be used.

In 810, a voice channel connection to called device 124 via network 112 can be established after the called device 124 has been located and registered to a mobile switch and/or base station of called device service provider 116. In 812, the calling device 102 can receive user-supplied input to initiate a request to receive the location of called device 124 via a USSD message, input, or action. In one or more implementations, the USSD input or action can comprise a user-supplied keypad input of a star-code activation code or key, such as "*55" or other key combination. In 814, in response to the paging, call setup and user asterisk-keyed processes, the calling device 102 can receive a USSD 136 location message 136 via network 112 using a USSD channel. USSD location message 136 can contain called device location data 114 reporting the location of the called device 124 to the user of calling device 102. Called device location data 114 can be encoded in a format, for instance, illustrated in FIG. 4, in which a string of USSD data can be encoded with the cell sector ID, cell sector location, or other information of the service provider base station in whose service area the called device 124 is currently located. In one or more implementations, other datagrams or encoding schemes consistent with the format of a USSD message can be used.

In 816, a display of called device location data 114 can be generated on calling device 102 via user interface 140, such as a screen display, text-to-speech generator, or other output. In 818, the calling device 102 can receive an updated version of called device location data 114 via a USSD location message 136, as appropriate. For example, an updated version of called device location data 114 can be generated when called device 124 enters a new service area of an adjoining base station of called device service provider 116, for instance after the call setup phase of the call to called device 124 is complete. In 820, processing can repeat, return to a prior processing point, jump to a further processing point, or end.

Figure 9:
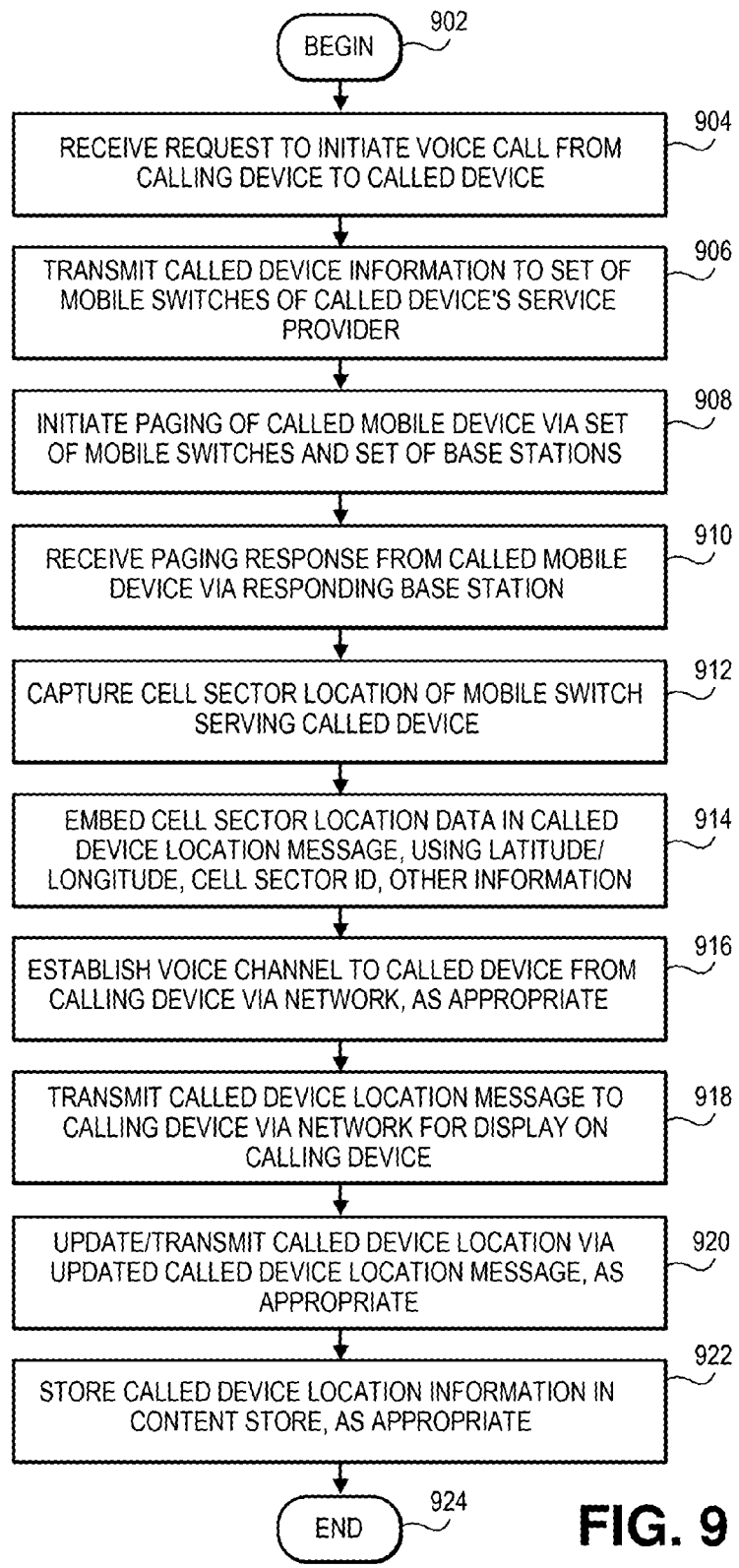
FIG. 9 illustrates a flowchart of call initiation and location processing using SMS (Short Message System) messaging, according to one or more implementations.

FIG. 9 illustrates overall processing by a service provider to a called device 124 to supply called device location data 114 in response to an initiated request from a calling device 102 for the location of the called device 124, according to one or more implementations. In 902, processing can begin. In 904, called device service provider 116 can receive a location query 110 from calling device 102 to identify the location of called device 124. Location query 110 can for instance be generated in any of various forms and/or protocols described herein. In 906, called device information 142 can be transmitted to the called device service provider 116, which can communicate that information to its set of mobile switches and/or associated base stations for its service area. In 908, a paging process to locate called device 124 can be initiated by called device service provider 116. In one or more implementations, the paging process can be or include processing illustrated in FIG. 2, and described herein.

In 910, the called device service provider 116 can receive a paging response encoded in paging handshake data 122 via terminating base station 144 with which called device 124 is registered. In 912, the cell sector location, cell sector ID, and/or other data associated with the terminating base station 144 presently serving or communicating with mobile device 124 can be captured by called device service provider 116. In 914, the cell sector location data and/or other information can be incorporated or embedded in a called device location data 114. The location information can, in one or more implementations, be encoded in any of the various message types (e.g., SMS, USSD, and/or other) formats described herein, and/or other protocols or messaging types. In 916, a voice channel 132 can be established to the called device 124 from the calling device 102 via network 112 and associated connections and resources, as appropriate.

In 918, the called device service provider 116 can transmit called device location data 114 to calling device 102 via network 112 for display on a user interface 140 of calling device 102, or other output. In 920, called device location data 114 can be updated and transmitted to calling device 102, for instance due to a transition by called device 124 to a new service area served by a different base station, as appropriate. In 922, called device location data 114 and/or other information related to the call event between calling device 102 and called device 124 can be stored to short-term or long-term storage. That information can be stored, for example, to any one or more of calling device 102, called device 124, content store 108 of calling device service provider 104, content store 120 of called device service provider 116, or other storage. In 924, processing can repeat, return to a prior processing point, jump to a further processing point, or end.

The foregoing description is illustrative, and variations in configuration and implementation may occur to persons skilled in the art. For instance, the various illustrative logics, logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In one or more exemplary implementations, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

For further example, while implementations have been described in which one calling device service provider 104 and one called device service provider 116 interact to locate called device 124 and report the location of that device to calling device 102, in one or more implementations more than one service provider and/or base station or other resources can support either calling device 102 or called device 124. For yet further example, while implementations have been described in which the location information for called device 124 is reported in either SMS (Short Message Service) or USSD (Unstructured Supplementary Service Data) formats, in one or more implementations, different or additional formats or messaging channels or types can be used. In one or more implementations, more than one format or channel can be used in the course of one call event. Other resources described as singular or integrated can in one or more implementations be plural or distributed, and resources described as multiple or distributed can in one or more implementations be combined. The scope of the present teachings is accordingly intended to be limited only by the following claims.

What is claimed is:

1. A method of generating location data for a mobile device, comprising:
   initiating a voice call from a calling device to a called mobile device;
   receiving a request from the calling device to capture location data of the called mobile device;
   initiating a paging process to locate the called mobile device via a called device service provider;
   identifying a cell sector location for the called mobile device based on a paging response of the called mobile device via the called device service provider;
   generating called device location data for the called mobile device based on the cell sector location identified via the called device service provider;
   transmitting the called device location data to the calling device; and
   storing information related to the voice call between the calling device and the called mobile device, wherein the storing information includes storing at least one geographic location of the called device.

2. The method of claim 1, wherein the called mobile device comprises at least one of a cellular telephone, a Global Positioning System (GPS) device, a network-enabled personal digital assistant device, or a network-enabled media player device.

3. The method of claim 1, wherein the request to capture location data of the called mobile device comprises at least one of automatically initiating the request based on a user profile or initiating the request based on a user-supplied input.

4. The method of claim 1, wherein the called device location comprises at least a set of longitude and latitude readings based on the cell sector location.

5. The method of claim 1, wherein the transmitting the called device location data to the calling device comprises at least one of transmitting the called device location data via a SMS (short message service) message, or transmitting the called device location data via a GSM (Global System for Mobile communication) Unstructured Supplementary Service Data (USSD) message.

6. The method of claim 1, further comprising generating an update to the called device location data based on a change in position of the called mobile device.

7. A system for generating location data for a mobile device, comprising:
   a server, communicating with a wireless interface to a called mobile device, the server being configured to:
      initiate a voice call from a calling device to the called mobile device,
      receive a request from the calling device to capture location data of the called mobile device,
      initiate a paging process to locate the called mobile device via a called device service provider,
      identify a cell sector location for the called mobile device based on a paging response of the called mobile device via the called device service provider,
      generate called device location data for the called mobile device based on the cell sector location identified via the called device service provider,
      transmit the called device location data to the calling device; and
      store information related to the voice call between the calling device and the called mobile device, wherein the server configured to store information includes storing at least one geographic location of the called device.

8. The system of claim 7, wherein the called mobile device comprises at least one of a cellular telephone, a Global Positioning System (GPS) device, a network-enabled personal digital assistant device, or a network-enabled media player device.

9. The system of claim 7, wherein the request to capture location data of the called mobile device comprises at least one of automatically initiating the request based on a user profile or initiating the request based on a user-supplied input.

10. The system of claim 7, wherein the called device location comprises at least a set of longitude and latitude readings based on the cell sector location.

11. The system of claim 7, wherein the called device location data is transmitted to the calling device via at least one of transmitting the called device location data via a SMS (short message service) message, or transmitting the called device location data via a GSM (Global System for Mobile communication) Unstructured Supplementary Service Data (USSD) message.

12. The system of claim 7, wherein the server is further configured to generate an update to the called device location data based on a change in position of the called mobile device.

13. A system for generating location data for a mobile device, comprising:
   means for serving data to a called mobile device, the means for serving data being configured to:
      initiate a voice call from a means for calling to the called mobile device,
      receive a request from the means for calling to capture location data of the called mobile device,
      initiate a paging process to locate the called mobile device via a called device service provider,
      identify a cell sector location for the called mobile device based on a paging response of the called mobile device via the called device service provider,
      generate called device location data for the called mobile device based on the cell sector location identified via the called device service provider,
      transmit the called device location data to the means for calling; and store information related to the voice call between the means for calling and the called mobile device, wherein the means configured to store information further includes storing at least one geographic location of the called device.

14. The system of claim 13, wherein the called mobile device comprises at least one of a cellular telephone, a Global Positioning System (GPS) device, a network-enabled personal digital assistant device, or a network-enabled media player device.

15. The system of claim 13, wherein the request to capture location data of the called mobile device comprises at least one of automatically initiating the request based on a user profile or initiating the request based on a user-supplied input.

16. The system of claim 13, wherein the called device location comprises at least a set of longitude and latitude readings based on the cell sector location.

17. The system of claim 13, wherein the called device location data is transmitted to the calling device via at least one of transmitting the called device location data via a SMS (short message service) message, or transmitting the called device location data via a GSM (Global System for Mobile communication) Unstructured Supplementary Service Data (USSD) message.

18. The system of claim 13, wherein the means for serving is further configured to generate an update to the called device location data based on a change in position of the called mobile device.

19. A non-transitory computer-readable medium comprising:
    at least one instruction for causing a computer to initiate a voice call from a calling device to a called mobile device;
    at least one instruction for causing the computer to receive a request from the calling device to capture location data of the called mobile device;
    at least one instruction for causing the computer to initiate a paging process to locate the called mobile device via a called device service provider;
    at least one instruction for causing the computer to identify a cell sector location for the called mobile device based on a paging response of the called mobile device via the called device service provider;
    at least one instruction for causing the computer to generate called device location data for the called mobile device based on the cell sector location identified via the called device service provider;
    at least one instruction for causing the computer to transmit the called device location data to the calling device; and
    at least one instruction for causing the computer to store information related to the voice call between the calling device and the called mobile device, wherein the at least one instruction to store information includes storing at least one geographic location of the called device.

20. The non-transitory computer-readable medium of claim 19, wherein the called mobile device comprises at least one of a cellular telephone, a Global Positioning System (GPS) device, a network-enabled personal digital assistant device, or a network-enabled media player device.

21. The non-transitory computer-readable medium of claim 19, wherein the request to capture location data of the called mobile device comprises at least one of automatically initiating the request based on a user profile or initiating the request based on a user-supplied input.

22. The non-transitory computer-readable medium product of claim 19, wherein the called device location comprises at least a set of longitude and latitude readings based on the cell sector location.

23. The non-transitory computer-readable of claim 19, wherein the transmitting the called device location data to the calling device comprises at least one of transmitting the called device location data via a SMS (short message service) message, or transmitting the called device location data via a GSM (Global System for Mobile communication) Unstructured Supplementary Service Data (USSD) message.

24. The non-transitory computer-readable medium of claim 19, further comprising generating an update to the called device location data based on a change in position of the called mobile device.

25. A method of receiving location information for a called device, comprising;
    initiating a voice call to a called mobile device serviced by a called device service provider;
    generating a request to capture location data of the called mobile device;
    initiating a paging process to locate the called mobile device via the called device service provider;
    receiving called device location data for the called mobile device based on a cell sector location identified via the paging process of the called device service provider; and
    storing the received called device location data for the called mobile device.

26. The method of claim 25, wherein the called mobile device comprises at least one of a cellular telephone, a Global Positioning System (GPS) device, a network-enabled personal digital assistant device, or a network-enabled media player device.

27. The method of claim 25, wherein the request to capture location data of the called mobile device comprises at least one of automatically initiating the request based on a user profile or initiating the request based on a user-supplied input.

28. The method of claim 25, wherein the called device location comprises at least a set of longitude and latitude readings based on the cell sector location.

29. The method of claim 25, wherein the called device location data is received in the communications device via at least one of transmitting the called device location data via a SMS (short message service) message, or transmitting the called device location data via a GSM (Global System for Mobile communication) Unstructured Supplementary Service Data (USSD) message.

30. The method of claim 25, further comprising receiving an update to the called device location data based on a change in position of the called mobile device.

31. A communications device, comprising:
    an interface to a called device service provider; and
    a processor, communicating with the interface, the processor being configured to:
        initiate a voice call to a called mobile device serviced by the called device service provider,
        generate a request to capture location data of the called mobile device,
        initiate a paging process to locate the called mobile device via the called device service provider,
        receive called device location data for the called mobile device based on a cell sector location identified via the paging process of the called device service provider; and
        store the received called device location data for the called mobile device.

32. The device of claim 31, wherein the called mobile device comprises at least one of a cellular telephone, a Global Positioning System (GPS) device, a network-enabled personal digital assistant device, or a network-enabled media player device.

33. The device of claim 31, wherein the request to capture location data of the called mobile device comprises at least one of automatically initiating the request based on a user profile or initiating the request based on a user-supplied input.

34. The device of claim 31, wherein the called device location comprises at least a set of longitude and latitude readings based on the cell sector location.

35. The device of claim 31, wherein the called device location data is received in the communications device via at least one of transmitting the called device location data via a SMS (short message service) message, or transmitting the called device location data via a GSM (Global System for Mobile communication) Unstructured Supplementary Service Data (USSD) message.

36. The device of claim 31, wherein the processor is further configured to receive an update to the called device location data based on a change in position of the called mobile device.

37. A communications device, comprising:
   means to provide an interface to a called device service provider; and
   means for processing, communicating with the interface, the means for processing being configured to:
      initiate a voice call to a called mobile device serviced by the called device service provider,
      generate a request to capture location data of the called mobile device,
      initiate a paging process to locate the called mobile device via the called device service provider,
      receive called device location data for the called mobile device based on a cell sector location identified via the paging process of the called device service provider; and
      store the received called device location data for the called mobile device.

38. The device of claim 37, wherein the called mobile device comprises at least one of a cellular telephone, a Global Positioning System (GPS) device, a network-enabled personal digital assistant device, or a network-enabled media player device.

39. The device of claim 37, wherein the request to capture location data of the called mobile device comprises at least one of automatically initiating the request based on a user profile or initiating the request based on a user-supplied input.

40. The device of claim 37, wherein the called device location comprises at least a set of longitude and latitude readings based on the cell sector location.

41. The device of claim 37, wherein the called device location data is received in the communications device via at least one of transmitting the called device location data via a SMS (short message service) message, or transmitting the called device location data via a GSM (Global System for Mobile communication) Unstructured Supplementary Service Data (USSD) message.

42. The device of claim 37, wherein the means for processing is further configured to receive an update to the called device location data based on a change in position of the called mobile device.

43. A non-transitory computer-readable medium, the non-transitory computer-readable medium being configured to program a communications device, comprising:
   at least one instruction for causing a computer to initiate a voice call to a called mobile device serviced by a called device service provider;
   at least one instruction for causing the computer to generate a request to capture location data of the called mobile device;
   at least one instruction for causing the computer to initiate a paging process to locate the called mobile device via the called device service provider;
   at least one instruction for causing the computer to receive called device location data for the called mobile device based on a cell sector location identified via the paging process of the called device service provider; and
   at least one instruction for causing the computer to store the received called device location data for the called mobile device.

44. The non-transitory computer-readable medium of claim 43, wherein the called mobile device comprises at least one of a cellular telephone, a Global Positioning System (GPS) device, a network-enabled personal digital assistant device, or a network-enabled media player device.

45. The non-transitory computer-readable medium of claim 43, wherein the request to capture location data of the called mobile device comprises at least one of automatically initiating the request based on a user profile or initiating the request based on a user-supplied input.

46. The non-transitory computer-readable medium of claim 43, wherein the called device location comprises at least a set of longitude and latitude readings based on the cell sector location.

47. The non-transitory computer-readable medium of claim 43, wherein the called device location data is received in the communications device via at least one of transmitting the called device location data via a SMS (short message service) message, or transmitting the called device location data via a GSM (Global System for Mobile communication) Unstructured Supplementary Service Data (USSD) message.

48. The non-transitory computer-readable medium of claim 43, further comprising at least one instruction for causing the computer to receive an update to the called device location data based on a change in position of the called mobile device.

49. The method of claim 1, wherein the storing information related to the voice call between the calling device and the called mobile device comprises one at least one of storing the information on the calling device or the called device.

* * * * *